Jan. 30, 1940.  F. BURGHAUSER  2,188,702
PUMP OR MOTOR
Filed Sept. 9, 1937   2 Sheets-Sheet 1

Inventor:
Franz Burghauser
By Arthur M. Lahm
ATTY.

Jan. 30, 1940. F. BURGHAUSER 2,188,702
PUMP OR MOTOR
Filed Sept. 9, 1937 2 Sheets-Sheet 2

Inventor:
Franz Burghauser
By Arthur M. Hahn
ATTY.

Patented Jan. 30, 1940

2,188,702

UNITED STATES PATENT OFFICE 2,188,702

PUMP OR MOTOR

Franz Burghauser, Nuremberg, Germany

Application September 9, 1937, Serial No. 163,141
In Germany August 13, 1937

4 Claims. (Cl. 103—128)

This invention relates to pumps or motors and more particularly to pumps or motors provided with screw-spindles.

My invention has for its general object to devise a construction of such screw-pumps or screw-motors, in which the forces acting on the screw-spindles are properly counteracted and equalized to prevent any undue strains from being imposed upon the spindles.

By action of the pressure of the operating liquid forces are exerted in axial direction upon the spindles of screw-pumps or screw-motors, these forces heretofore having been generally equalized by a counter-pressure exerted upon surfaces positioned perpendicularly to the axis of said spindles. For instance, in order to attain this, the spindles of such pumps or motors have been provided with axial bores or special equalizing pistons have been used for this purpose.

Besides the forces arising in axial direction, however, there will also be exerted forces upon the spindles by action of the pressure of the operating liquid, these forces being transversely directed with respect to the axes of said spindles as disclosed herein for the first time. These transverse forces, which as a rule are even in excess to the axial forces, had heretofore been transmitted upon the bearings and by way of the threads of the spindles upon the pump-casing. However, the friction produced by these forces is of such an excessive amount, that screw-motors frequently will not be able to start, this being due to the fact that the frictional moment to be overcome is larger than the torque exerted upon the spindles by the pressure of the operating liquid.

In order to more fully explain my present invention I will first illustrate herein by way of an example how these transverse forces acting upon the screw-spindles are produced by the pressure of the operating liquid. This action of the transverse forces, as far as I am aware, has heretofore never been described nor even mentioned. As an example I have chosen a screw-pump having a main spindle with a single thread and a side-spindle with a double thread.

Figure 1:
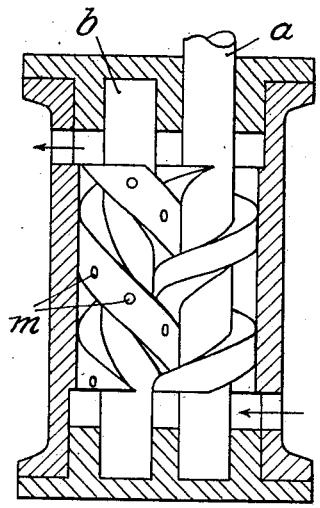
Figure 3:
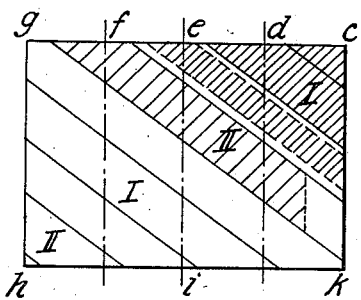
Figure 2:
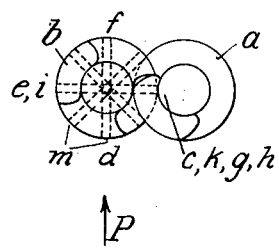
Figure 4:
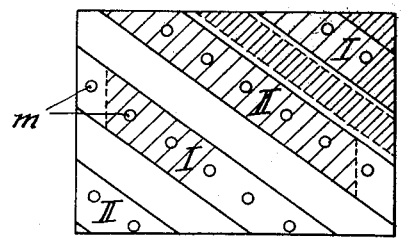
Figure 5:
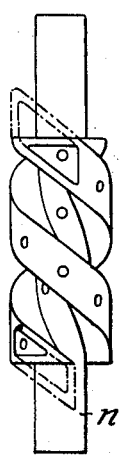
Figure 6:
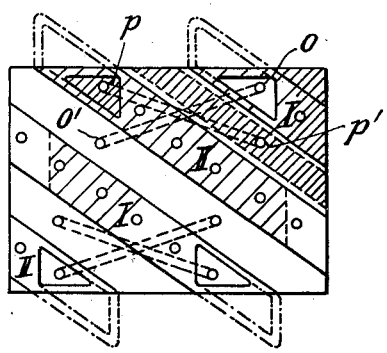
Figure 7:
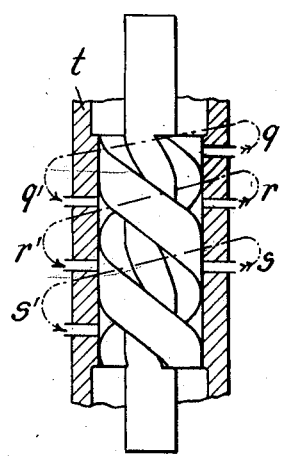
Figure 8:
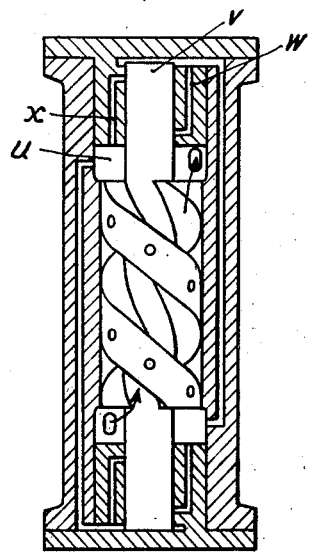

In the drawings, Fig. 1 is a longitudinal central section through my novel screw-pump comprising an arrangement whereby said axial forces may successfully be counteracted by providing bores within the threads of said side-spindle, Fig. 2 is a top-view of the spindles forming part of the construction of Fig. 1, Fig. 3 is a diagram showing the threads of said main and said side-spindle developed out in a plane, Fig. 4 is a further diagram similar to Fig. 3 showing the threads of the side-spindle together with the bores forming part of the construction of Fig. 1, Fig. 5 is a vertical view of a side-spindle constructed with bores which are modified with respect to the bores shown in Fig. 1, Fig. 6 is a further diagram showing said spindle of Fig. 5 developed out in a plane, Fig. 7 is a modified construction of a screw-pump with a single spindle in which the aforesaid transverse forces acting on the spindle are counteracted by providing special bores in the pump-casing, and Fig. 8 is a central longitudinal section through a further modified construction of my present pump having also a single spindle, wherein the transverse forces are counteracted by providing special channels within the bearings.

In the construction of my present pump shown in Fig. 1 the transverse forces acting upon the main spindle $a$ are practically of no importance, while heavy strains are imposed upon the side-spindle $b$. In the diagram of Fig. 3 which represents the outer periphery of the side-spindle, the whole of the operating pressure in the position of the two spindles shown in Fig. 1 acts along the heavily shaded surfaces in radial direction upon the side-spindle, while along the lightly shaded surfaces there is exerted only one-half of the operating pressure. Within the gap between the thread I and the pump-casing there prevails a pressure, the so-called gap-pressure, which at this place is equal to the full operating pressure and acts in radial direction upon the thread I. Onto the surfaces of the groove intermediate said threads I and II the full operating pressure does not act over the entire width of said groove, but only over a reduced width in accordance with the reduced diameter. Upon said thread II a pressure acts only over one-half of the width of said thread in accordance with the full operating pressure acting upon the upper edge of the thread and with the pressure in the groove positioned below said thread II, this pressure being assumed to be zero in the present case. Apparently a considerable surplus of radial strain will be imposed upon the visible half of the side-spindle with a projected component P.

According to my invention the gap-pressures intermediate the rotating spindle-surfaces $x$ and the pump-casing are regulated and disposed of in such a manner that the transverse forces acting upon the spindles will either be in part counteracted or wholly disappear or even act advantageously in reversed direction.

A partial equalization of the transverse forces may be attained, if the threads of the spindles are provided with transverse bores m as shown in Figs. 1 and 2 as well as in the diagram of Fig. 4. As may easily be seen, the front visible half of the spindles may thus be relieved from the gap-pressure, while this pressure acts upon the rear part of the spindles. In like manner the spindles are also provided with bores at their ends adjacent the entrance of the operating liquid, because upon further rotation of said spindle there will likewise arise gap-pressures at this place which must be counteracted.

While the aforedescribed arrangement is designed to relieve the spindle of transverse forces arising from thread to thread, it is also possible to attain such relief by transverse bores from groove to thread. As an example of this, there may again serve the above-mentioned pump having a main spindle with a single thread and a side-spindle with two threads. In Fig. 5 I have shown only the side-spindle n which is to be relieved of strain, while Fig. 6 shows diagrammatically the forces acting upon said spindle. In this case bores lead from the ends of the threads to the opposite grooves, said bores being designated by o, o' and p, p' in Fig. 6.

Thus the thread I will be relieved from strain at the point o, while the thread II is under action of the full pressure of the operating liquid. In order to render these equalizing surfaces as effective as possible, the bores o, p are enlarged to merge into a depressed surface at the exit end, which surface may even extend beyond the spindle as indicated in dashdotted lines in Fig. 6.

While the so far described possibilities of providing a relief of transverse forces consist in the provision of transverse bores in the spindles, such bores may also be provided in the stationary part of the pump, that is in the pump-casing, in which case the gap-pressures arising intermediate the threads and the casing are controlled by the threads of the spindle as shown in Fig. 7. The transverse bores q—q', r—r', and s—s', which are provided as shown in Fig. 7 in the pump-casing are in connection with each other in pairs and thus will act to relieve one side of the spindle from pressure while the other side thereof is under the pressure of the operating liquid.

Finally, according to my invention, there is the possibility to regulate the gap-pressures between gap-surfaces which are positioned outside of the pump-casing as indicated in Fig. 8. According to Fig. 8 oil under pressure is passed from the pressure-space u through the cylindrical gap of the bearing v and through a longitudinal bore in the casing and returned into the suction-space. On the one side the bearing is relieved from pressure by a bore w leading to the suction-space, while the other side is under the pump-pressure directly from the pressure-space, through a bore x. In accordance with this, also the bearing in the suction-space is properly constructed to counteract that part of the transverse thrust exerted onto said suction-space. In this construction the proper dimensioning of the diameters of the bearings is connected with the further advantage that together with known means the axial thrust arising will be counteracted. In addition to this, there may also be provided the aforedescribed means which serve to equalize transverse forces.

The aforedescribed means for counteracting the transverse forces acting upon the spindles as well as the combination of such means with an arrangement providing for relieving the spindles from strain in axial direction may principally be employed in connection with all spindles forming part of various kinds of screw-pumps and screw-motors and will always be effected in proportion with the pressure of the operating liquid.

My invention, accordingly, provides the possibility of constructing screw-pumps or screw-motors which are fully relieved from forces acting between operating parts and the operating characteristics of the materials employed do not need to comply with special requirements. Therefore, by my invention, it will be possible to construct screw-pumps or screw-motors from cheap structural materials and to attain an almost unlimited lifetime of the pump or motor.

I claim:

1. In a pump or motor comprising a plurality of interengaging screw spindles the convolutions of the threads of said spindles describing at least one complete turn about their respective axes, a casing housing said screw spindles with a running fit with the addenda of said spindles, and means comprising a by-pass connecting the area between the immediately adjacent surfaces of the addendum of at least one of said spindles and said housing with the opposite side of said spindle for equalizing the pressures on opposite sides of said spindles, whereby the forces exerted on the spindles by the pressure of operating fluid between said adjacent surfaces transverse to the axes of said spindles, are counteracted.

2. In a pump or motor, the combination of a plurality of interengaging screw spindles, the convolutions of the threads of said spindles describing at least one complete turn about their respective axes, a housing substantially encompassing said screw spindles with a running fit with the addendum of said screw spindles, and means comprising a transverse bore extending through at least one of said spindles between substantially opposite radial extremities thereof and connecting the area between the immediately adjacent surfaces of the addendum of said last named spindle and said housing on one side of said spindle, with the corresponding area on the opposite side of said spindle, for equalizing the pressures on opposite sides of said screw spindle, whereby the forces exerted on the spindle by the pressure of operating fluid between said adjacent surfaces transverse to the axis of said spindle, are counteracted.

3. In a pump or motor, the combination of a plurality of interengaging screw spindles, the convolutions of the threads of said spindles describing at least one complete turn about their respective axes, a housing substantially encompassing said screw spindles with a running fit with the addendum of said screw spindles, and means comprising a plurality of transverse bores extending through at least one of said spindles between substantially opposite radial extremities thereof and connecting the areas between the immediately adjacent surfaces of the addendum of said last named spindle and said housing at spaced points on one side of said spindle, with corresponding areas on the opposite side of said spindle, for equalizing the pressures on opposite sides of said screw spindle, whereby the forces exerted on the spindle by the pressure of operating fluid between said adjacent surfaces transverse to the axis of said spindle, are counteracted.

4. In a pump or motor, the combination of a plurality of interengaging screw spindles, the convolutions of the threads of said spindles describing at least one complete turn about their respective axes, a housing substantially encompassing said screw spindles with a running fit with the addendum of said screw spindles, and means comprising a transverse bore extending through at least one of said spindles from the addendum of said spindle on one side to the space between the addenda on the opposite side of said spindle, connecting the area between the immediately adjacent surfaces of the addendum of said spindle and said housing on one side of said spindle, with the opposite side of said spindle, for equalizing the pressures on opposite sides of said screw spindles, whereby the forces exerted on the spindle by the pressure of operating fluid between said adjacent surfaces transverse to the axis of said spindle, are counteracted.

FRANZ BURGHAUSER.